US012610129B2

(12) United States Patent
Nakayari

(10) Patent No.: US 12,610,129 B2
(45) Date of Patent: Apr. 21, 2026

(54) INFORMATION PROCESSING APPARATUS, METHOD, AND STORAGE MEDIUM

(71) Applicant: CANON KABUSHIKI KAISHA, Tokyo (JP)

(72) Inventor: Tatsuya Nakayari, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 18/295,164

(22) Filed: Apr. 3, 2023

(65) Prior Publication Data

US 2023/0328366 A1      Oct. 12, 2023

(30) Foreign Application Priority Data

Apr. 11, 2022    (JP) ................................. 2022-065234

(51) Int. Cl.
| | |
|---|---|
| *H04N 23/617* | (2023.01) |
| *H04N 23/63* | (2023.01) |
| *H04N 23/661* | (2023.01) |
| *H04N 23/69* | (2023.01) |
| *H04N 23/695* | (2023.01) |

(52) U.S. Cl.
CPC ......... *H04N 23/617* (2023.01); *H04N 23/631* (2023.01); *H04N 23/661* (2023.01); *H04N 23/69* (2023.01); *H04N 23/695* (2023.01)

(58) Field of Classification Search
CPC .... H04N 23/617; H04N 23/62; H04N 23/631; H04N 23/633; H04N 23/64; H04N 23/661; H04N 23/69; H04N 23/695; H04N 23/90
See application file for complete search history.

(56) References Cited

U.S. PATENT DOCUMENTS

| | | | | |
|---|---|---|---|---|
| 2010/0118162 A1* | 5/2010 | Saijo | ...................... | H04N 23/90 |
| | | | | 348/231.6 |
| 2012/0079406 A1* | 3/2012 | Medhurst | ............... | H04N 23/62 |
| | | | | 715/769 |
| 2014/0267706 A1 | 9/2014 | Springer | | |
| 2016/0127635 A1* | 5/2016 | Taoki | ..................... | H04N 7/183 |
| | | | | 348/39 |
| 2016/0150193 A1* | 5/2016 | Niida | ..................... | G03B 37/02 |
| | | | | 348/143 |
| 2018/0376078 A1* | 12/2018 | Adachi | .................. | H04N 23/69 |
| 2019/0057020 A1* | 2/2019 | Suzuki | ............... | G06F 11/3698 |
| 2020/0014854 A1* | 1/2020 | Katsunuma | ........ | G05B 19/4183 |
| 2021/0092289 A1* | 3/2021 | Honjo | .................. | H04N 23/661 |
| 2023/0007164 A1* | 1/2023 | Kamba | .................. | H04N 23/76 |
| 2023/0069440 A1* | 3/2023 | Kamba | ................ | H04N 23/661 |

FOREIGN PATENT DOCUMENTS

| | | |
|---|---|---|
| JP | H0965175 A | 3/1997 |
| JP | 2019041140 A | 3/2019 |

* cited by examiner

*Primary Examiner* — Daniel M Pasiewicz
(74) *Attorney, Agent, or Firm* — Canon U.S.A., Inc. IP Division

(57) ABSTRACT

An information processing apparatus includes at least one processor configured to function as a recording unit configured to record trace information indicating time-series transition during a predetermined period of a first parameter related to control of an imaging apparatus, and an update unit configured to, in a case where a user operation for controlling the imaging apparatus using a second parameter different from the first parameter is performed during reproduction of the trace information, update the trace information in such a manner as to include the second parameter.

13 Claims, 15 Drawing Sheets

| TRACE ID | TRACE INFORMATION |
|---|---|
| 1 | [{"start": {"pan": 100, "tilt": 20, "zoom": 60, ...}}, {"end": {"elapsed time": 2050, "pan": 40, "tilt": 50, "zoom": 20, ...}}, [{"elapsed time": 100, "command": "pan.speed=10&pan.dir=left&tilt&tilt.dir=up..." }, {"elapsed time": 200, "command": "pan.speed=20&pan.dir=left&tilt.dir=up..." }, {"elapsed time": 300, "command": "pan.speed=30&pan.dir=left&tilt.dir=up..." }, {"elapsed time": 400, "command": "pan.speed=40&pan.dir=left&tilt.dir=up..." }, {"elapsed time": 500, "command": "pan.speed=50&pan.dir=left&tilt.dir=up..." }, ... {"elapsed time": 1600, "command": "pan.speed=40&pan.dir=left&tilt.speed=8&tilt.dir=up..." }, {"elapsed time": 1700, "command": "pan.speed=30&pan.dir=left&tilt.speed=6&tilt.dir=up..." }, {"elapsed time": 1800, "command": "pan.speed=20&pan.dir=left&tilt.speed=4&tilt.dir=up..." }, {"elapsed time": 1900, "command": "pan.speed=10&pan.dir=left&tilt.speed=2&tilt.dir=up..." }, {"elapsed time": 2000, "command": "pan.speed=0&pan.dir=left&tilt.speed=0&tilt.dir=up..." },]] |
| 2 | ... |
| 3 | ... |

| TRACE ID | TRACE INFORMATION |
|---|---|
| 1 | [{"start": {"pan": 100, "tilt": 20, "zoom": 60, ...}},<br>{"end": {"elapsed time": 2050, "pan": 40, "tilt": 50, "zoom": 20, ...}},<br>[{"elapsed time": 100, "command": "pan.speed=10&pan.dir=left&tilt.speed=2&tilt.dir=up..." },<br>{"elapsed time": 200, "command": "pan.speed=20&pan.dir=left&tilt.speed=4&tilt.dir=up..." },<br>{"elapsed time": 300, "command": "pan.speed=30&pan.dir=left&tilt.speed=6&tilt.dir=up..." },<br>{"elapsed time": 400, "command": "pan.speed=40&pan.dir=left&tilt.speed=8&tilt.dir=up..." },<br>{"elapsed time": 500, "command": "pan.speed=50&pan.dir=left&tilt.speed=10&tilt.dir=up..." },<br>...<br>{"elapsed time": 1600, "command": "pan.speed=40&pan.dir=left&tilt.speed=8&tilt.dir=up..." },<br>{"elapsed time": 1620, "command": "zoom.speed=50&zoom.dir=tele&... }, ~701<br>{"elapsed time": 1700, "command": "pan.speed=30&pan.dir=left&tilt.speed=6&tilt.dir=up..." },<br>{"elapsed time": 1780, "command": "zoom.speed=0&zoom.dir=tele&... }, ~702<br>{"elapsed time": 1800, "command": "pan.speed=20&pan.dir=left&tilt.speed=4&tilt.dir=up..." },<br>{"elapsed time": 1900, "command": "pan.speed=10&pan.dir=left&tilt.speed=2&tilt.dir=up..." },<br>{"elapsed time": 2000, "command": "pan.speed=0&pan.dir=left&tilt.speed=0&tilt.dir=up..." },]] |
| 2 | ... |
| 1 | ... |

| *501* | *502* |
|---|---|
| TRACE ID | TRACE INFORMATION |
| 1 | [{"start": {"pan": 100, "tilt": 20, "zoom": 60, ...}}, <br> {"end", {"elapsed time": 2050, "pan": 40, "tilt": 50, "zoom": 20, ...}}, <br> [{"elapsed time": 100, "command": "tilt.speed=2&tilt.dir=up..." }, <br> {"elapsed time": 200, "command": "tilt.speed=4&tilt.dir=up..." }, <br> {"elapsed time": 300, "command": "tilt.speed=6&tilt.dir=up..." },   *801* <br> {"elapsed time": 400, "command": "pan.speed=40&pan.dir=left&tilt.speed=8&tilt.dir=up..." }, <br> {"elapsed time": 500, "command": "pan.speed=50&pan.dir=left&tilt.speed=10&tilt.dir=up..." }, <br> ... <br> {"elapsed time": 1600, "command": "pan.speed=40&pan.dir=left&tilt.speed=8&tilt.dir=up..." }, <br> {"elapsed time": 1700, "command": "pan.speed=30&pan.dir=left&tilt.speed=6&tilt.dir=up..." }, <br> {"elapsed time": 1800, "command": "pan.speed=20&pan.dir=left&tilt.speed=4&tilt.dir=up..." }, <br> {"elapsed time": 1900, "command": "pan.speed=10&pan.dir=left&tilt.speed=2&tilt.dir=up..." }, <br> {"elapsed time": 2000, "command": "pan.speed=0&pan.dir=left&tilt.speed=0&tilt.dir=up..." },]] |
| 2 | ... |
| 1 | ... |

| TRACE ID | TRACE INFORMATION |
|---|---|
| 501 | 502 |
| 1 | [{"start": {"pan": 100, "tilt": 20, "zoom": 60, ...}}, {"end": {"elapsed time": 2050, "pan": 40, "tilt": 50, "zoom": 20, ...}}, [{"elapsed time": 100, "command": "pan.speed=10&pan.dir=left&tilt.speed=2&tilt.dir=up..."}, {"elapsed time": 200, "command": "pan.speed=20&pan.dir=left&tilt.speed=4&tilt.dir=up..."}, {"elapsed time": 300, "command": "pan.speed=30&pan.dir=left&tilt.speed=6&tilt.dir=up..."}, {"elapsed time": 400, "command": "pan.speed=40&pan.dir=left&tilt.speed=8&tilt.dir=up..."}, {"elapsed time": 500, "command": "pan.speed=50&pan.dir=left&tilt.speed=10&tilt.dir=up..."}, ⋮ {"elapsed time": 1600, "command": "pan.speed=40&pan.dir=left&tilt.speed=8&tilt.dir=up..."}, {"elapsed time": 1780, "command": "wb.rgain=125&wb.bgain=256&wb.ggain=0"}, ⟵1301 {"elapsed time": 1700, "command": "pan.speed=30&pan.dir=left&tilt.speed=6&tilt.dir=up..."}, {"elapsed time": 1800, "command": "pan.speed=20&pan.dir=left&tilt.speed=4&tilt.dir=up..."}, {"elapsed time": 1900, "command": "pan.speed=10&pan.dir=left&tilt.speed=2&tilt.dir=up..."}, {"elapsed time": 2000, "command": "pan.speed=0&pan.dir=left&tilt.speed=0&tilt.dir=up..."}]] |
| 2 | ⋮ |
| 1 | ⋮ |

INFORMATION PROCESSING APPARATUS, METHOD, AND STORAGE MEDIUM

BACKGROUND

Field

The present disclosure generally relates to an information processing technique and, more particularly, to an information processing apparatus, an information processing method, and a storage medium.

Description of the Related Art

In recent years, along with the expansion of a video delivery market, a system for performing image capturing in a wedding ceremony or a lecture meeting using an imaging apparatus that can perform remote control and video capturing via a network has become widespread. An imaging apparatus that can perform a remote operation uses a method of performing an operation using a hardware controller, or a method of performing an operation using an application (software controller) operating on a personal computer (PC) or a mobile terminal.

Trace recording has been conventionally used as a method of controlling an imaging apparatus. In the trace recording, a user controls parameters corresponding to an image capturing range of an imaging apparatus, and parameters corresponding to video quality, and a series of controlled parameters are recorded as trace information. Then, referring to the parameters included in the recorded trace information, the imaging apparatus is controlled in such a manner as to trace the user's control of the imaging apparatus.

Japanese Patent Application Laid-Open No. H9-65175 discusses a trace recording technique that can perform a remote operation of a lens and a pan head. According to the technique, operation states of the lens and the pan head are continuously recorded as trajectory data, the recorded trajectory data is called, and the same operation as a recorded trajectory is reproduced.

In Japanese Patent Application Laid-Open No. H9-65175, because operations of the pan head and the lens are concurrently recorded in trace recording, the user needs to simultaneously control parameters desired to be recorded in trace recording, which has been difficult in some cases.

SUMMARY

In view of the foregoing, the present disclosure is directed to the provision of a technique that reduces load on a user.

According to some embodiments, an information processing apparatus includes at least one processor configured to function as a recording unit configured to record trace information indicating time-series transition during a predetermined period of a first parameter related to control of an imaging apparatus, and an update unit configured to, in a case where a user operation for controlling the imaging apparatus using a second parameter different from the first parameter is performed during reproduction of the trace information, update the trace information in such a manner as to include the second parameter.

Further features of the present disclosure will become apparent from the following description of exemplary embodiments with reference to the attached drawings.

BRIEF DESCRIPTION OF THE DRAWINGS

FIG. 5 is a diagram illustrating a trace information table.

FIG. 7 is a diagram illustrating update of trace information.

FIG. 8 is a diagram illustrating update of trace information.

FIG. 13 is a diagram illustrating update of trace information.

DESCRIPTION OF THE EMBODIMENTS

Figure 1:
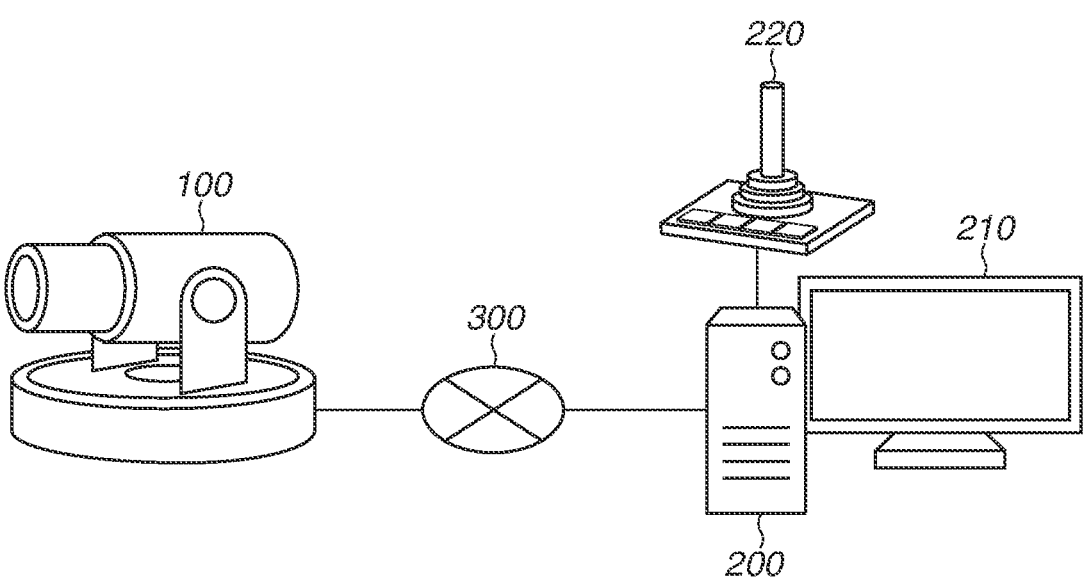
FIG. 1 is a diagram illustrating an example of a system configuration.

Various exemplary embodiments of the present disclosure will be described with reference to the attached drawings. The components to be described in the following exemplary embodiments merely serve as an example, and the components are not limited to those illustrated in the drawings.

FIG. 1 is a diagram illustrating a system configuration according to a first exemplary embodiment. A system according to the present exemplary embodiment includes an imaging apparatus 100, an information processing apparatus 200, a display 210, a joystick 220, and a network 300.

The imaging apparatus 100 and the information processing apparatus 200 are connected to each other via the network 300. The network 300 is implemented by a plurality of routers, switches, and cables that comply with a communication standard such as Ethernet (registered trademark), for example.

The network 300 may be implemented by the Internet, a wired local area network (LAN), a wireless LAN, or a wide area network (WAN).

The imaging apparatus 100 is an apparatus that captures images, and functions as an imaging unit that can control an image capturing range by controlling (changing) at least any value of a pan value, a tilt value, and a zoom value. The imaging apparatus 100 transmits, to an external apparatus such as the information processing apparatus 200 via the network 300, image data of a captured image, information regarding image capturing date and time on which an image has been captured, identification information for identifying the imaging apparatus 100, and information regarding an image capturing range of the imaging apparatus 100. The information processing apparatus 200 is a client apparatus such as a personal computer on which a program for implementing a function of processing to be described below is installed, for example. The system according to the present exemplary embodiment includes one imaging apparatus 100, but the system may include a plurality of imaging apparatuses 100. In other words, a plurality of imaging apparatuses 100 may be connected with the information processing apparatus 200 via the network 300. In this case, using identification information associated with a transmitted image, for example, the information processing apparatus 200 determines an imaging apparatus 100 that has captured the transmitted image, from among the plurality of imaging apparatuses 100.

The display 210 includes a liquid crystal display (LCD), and displays an image captured by the imaging apparatus 100. The display 210 is connected with the information processing apparatus 200 via a display cable complying with a communication standard such as a High Definition Multimedia Interface (HDMI) (registered trademark). The display 210 and the information processing apparatus 200 may be provided in a single casing. The joystick 220 is an input device to be used for controlling the imaging apparatus 100, and operated by the user. The system according to the present exemplary embodiment has a configuration including the joystick 220, but the configuration is not limited to this, and another input device may be used.

Figure 2:
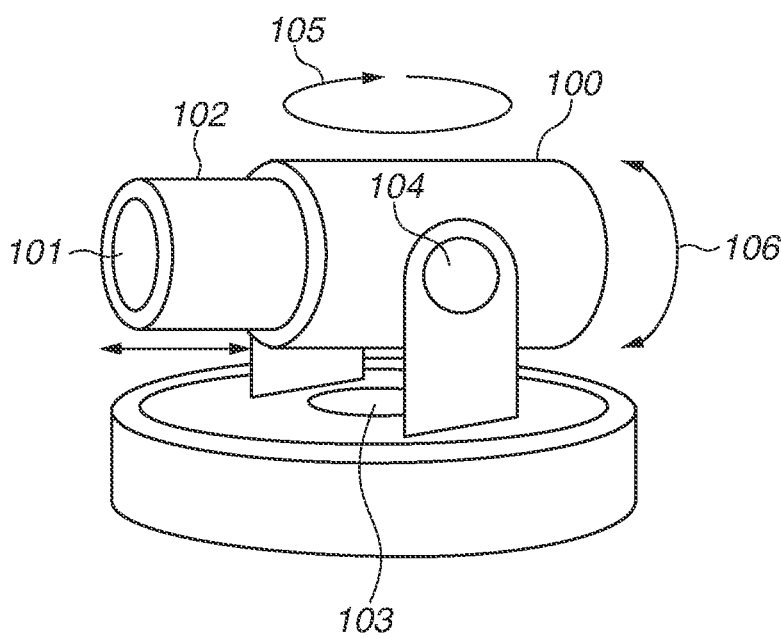
FIG. 2 is a diagram illustrating an example of an external appearance of an imaging apparatus.
Figure 3:
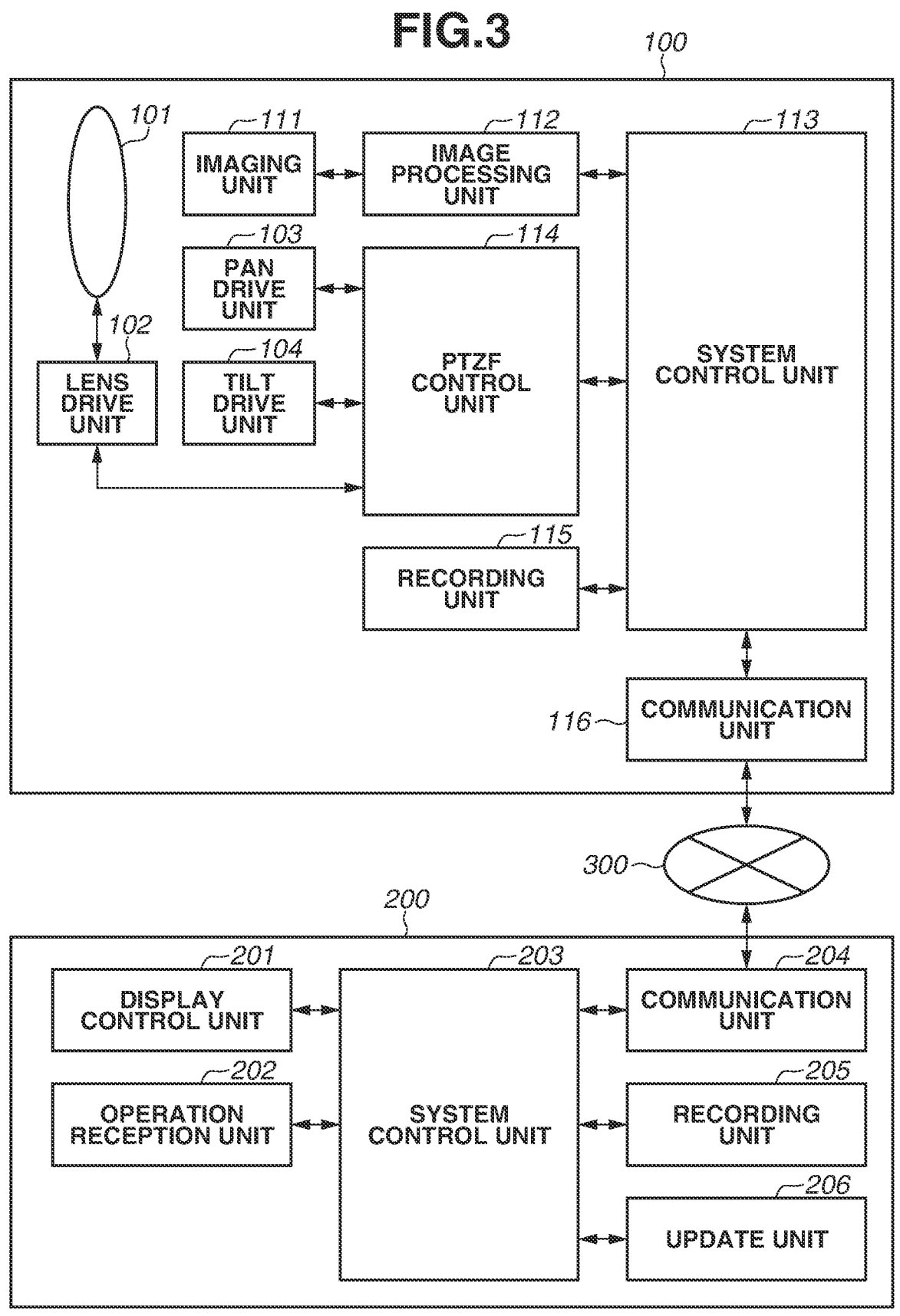
FIG. 3 is a diagram illustrating an example of functional blocks of an imaging apparatus and an information processing apparatus.

Next, the imaging apparatus 100 according to the present exemplary embodiment will be described with reference to FIGS. 2 and 3. FIG. 2 illustrates an example of an external view of the imaging apparatus 100 according to the present exemplary embodiment. FIG. 3 illustrates an example of functional blocks of the imaging apparatus 100 and the information processing apparatus 200 according to the present exemplary embodiment. Among functional blocks of the imaging apparatus 100 that are illustrated in FIG. 3, each of the functions of an image processing unit 112, a system control unit 113, a PTZF control unit 114, a recording unit 115, and a communication unit 116 is implemented as follows. More specifically, each function is implemented by a central processing unit (CPU) 1500 of the imaging apparatus 100 executing a computer program stored in a read only memory (ROM) 1520 of the imaging apparatus 100, which will be described below with reference to FIG. 15.

A direction in which an optical axis of a lens 101 extends corresponds to an image capturing direction of the imaging apparatus 100, and a light ray having passed through the lens 101 forms an image on an image sensor of an imaging unit 111 of the imaging apparatus 100. A lens drive unit 102 includes a drive system that drives the lens 101, and changes a focal length of the lens 101. The lens drive unit 102 can also control a focus value of the imaging apparatus 100. The lens drive unit 102 is controlled by the PTZF control unit 114.

A pan drive unit 103 includes a mechanical drive system that performs a pan operation, and a motor serving as a drive source. The pan drive unit 103 performs rotational drive for rotationally driving an image capturing direction of the imaging apparatus 100 in a pan direction 105. The pan drive unit 103 is controlled by the PTZF control unit 114.

A tilt drive unit 104 includes a mechanical drive system that performs a tilt operation, and a motor serving as a drive source. The tilt drive unit 104 performs rotational drive for rotationally driving an image capturing direction of the imaging apparatus 100 in a tilt direction 106. The tilt drive unit 104 is controlled by the PTZF control unit 114.

The imaging unit 111 includes an image sensor (not illustrated) such as a charge coupled device (CCD) sensor or a complementary metal oxide semiconductor (CMOS) sensor. Then, the imaging unit 111 generates an electric signal by photoelectrically converting a subjected image formed through the lens 101. The image processing unit 112 generates image data being data of a captured image, by performing image processing such as processing of converting an electric signal photoelectrically converting by the imaging unit 111, into a digital signal, and compression coding processing.

The PTZF control unit 114 controls a pan value, a tilt value, and a zoom value of the imaging apparatus 100 by controlling the pan drive unit 103, the tilt drive unit 104, and the lens drive unit 102 based on an instruction transmitted from the system control unit 113. The PTZF control unit 114 also controls a focus value of the imaging apparatus 100 by controlling the lens drive unit 102 based on an instruction transmitted from the system control unit 113.

Figure 15:
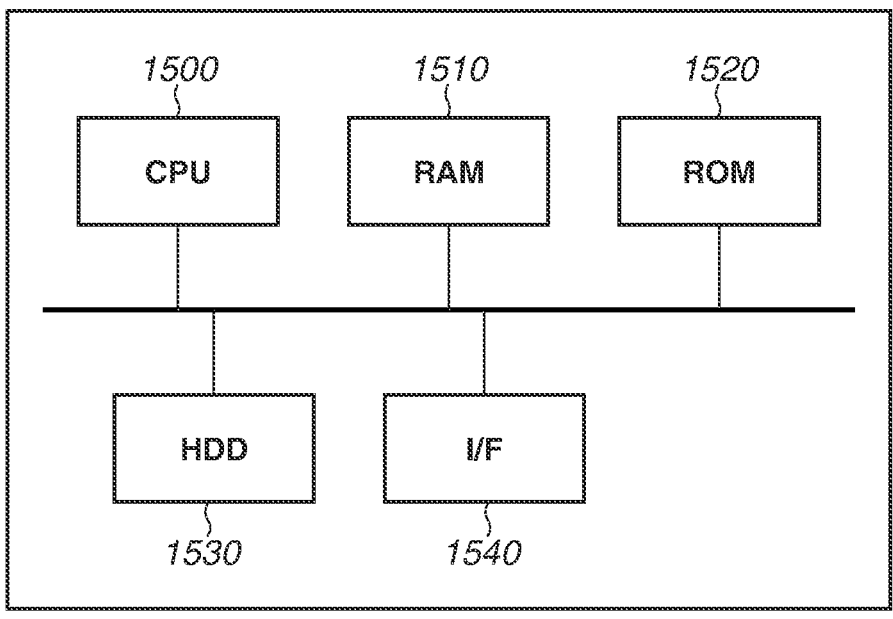
FIG. 15 is a diagram illustrating an example of a hardware configuration of each apparatus.

The communication unit 116 communicates with the information processing apparatus 200 via an interface (I/F) 1540 to be described below with reference to FIG. 15. For example, the communication unit 116 transmits image data of an image captured by the imaging apparatus 100, to the information processing apparatus 200 via the network 300. The communication unit 116 also transmits information indicating a current image capturing range of the imaging apparatus 100 (information regarding a current pan value, a current tilt value, and a current zoom value). The communication unit 116 also receives a control command being a command for controlling the imaging apparatus 100 that has been transmitted from the information processing apparatus 200, and transmits the control command to the system control unit 113.

In accordance with processing to be executed by the CPU 1500 to be described below with reference to FIG. 15, the system control unit 113 controls the entire imaging apparatus 100, and performs the following processing, for example. More specifically, the system control unit 113 analyzes a control command for controlling the imaging apparatus 100 that has been transmitted from the information processing apparatus 200, and performs processing corresponding to the control command. The system control unit 113 also issues an instruction for performing control of changing at least any value of a pan value, a tilt value, and a zoom value, or for controlling a focus value to the PTZF control unit 114. When image data generated by the image processing unit 112 is transmitted to the information processing apparatus 200, the system control unit 113 adds information regarding an image capturing time at which the image data has been generated, and information regarding an image capturing range, to the image data.

The image capturing range is defined by a pan value, a tilt value, and a zoom value of the imaging apparatus 100. The imaging apparatus 100 according to the present exemplary embodiment can control a pan value, a tilt value, and a zoom value, but may be enabled to control only one value or two values of a pan value, a tilt value, and a zoom value. The pan value indicates an angle of an image capturing direction (optical axis) in the pan direction 105 of the imaging apparatus 100 that is set when an angle at one drive end of the pan drive unit 103 is assumed to be 0°, for example. The tilt value indicates an angle of an image capturing direction (optical axis) in the tilt direction 106 of the imaging apparatus 100 that is set when an angle at one drive end of the tilt drive unit 104 is assumed to be 0°, for example. A zoom value of the imaging apparatus 100 that is set when an image is captured by the imaging apparatus 100 is calculated from a focal length of the lens 101.

Subsequently, information processing to be executed by the information processing apparatus 200 according to the present exemplary embodiment will be described with reference to the functional blocks of the information processing apparatus 200 that are illustrated in FIG. 3. Each function of the information processing apparatus 200 is implemented as follows using the ROM 1520 and the CPU 1500, which will be described below with reference to FIG. 15. More specifically, each function illustrated in FIG. 3 is implemented by the CPU 1500 of the information processing apparatus 200 executing a computer program stored in the ROM 1520 of the information processing apparatus 200.

A display control unit 201 displays a graphical user interface (GUI) for trace recording or trace information update to be described below, on the display 210. An operation reception unit 202 receives information regarding an operation performed by a user via an input device (not illustrated) such as a keyboard, a mouse, or a touch panel, or the joystick 220. For example, the display control unit 201 displays a GUI on the display 210, and the operation reception unit 202 receives information regarding a user operation performed on the GUI displayed on the display 210.

In accordance with a user operation, a system control unit 203 transmits a control command to the imaging apparatus 100 via a communication unit 204.

The communication unit 204 transmits a control command of the imaging apparatus 100 to the imaging apparatus 100 via the I/F 1540 to be described below with reference to FIG. 15. The communication unit 204 also receives image data transmitted from the imaging apparatus 100, or a response from the imaging apparatus 100 to a command transmitted from the information processing apparatus 200 to the imaging apparatus 100, and transmits the received image data or response to the system control unit 203.

The system control unit 203 generates a control command based on a user operation received by the operation reception unit 202, and transmits the control command to the imaging apparatus 100 via the communication unit 204. In a case where received image data is encoded, the system control unit 203 acquires an image (image captured by the imaging apparatus 100) by decoding the encoded image data, and the display control unit 201 displays the image on the display 210.

Figure 4:
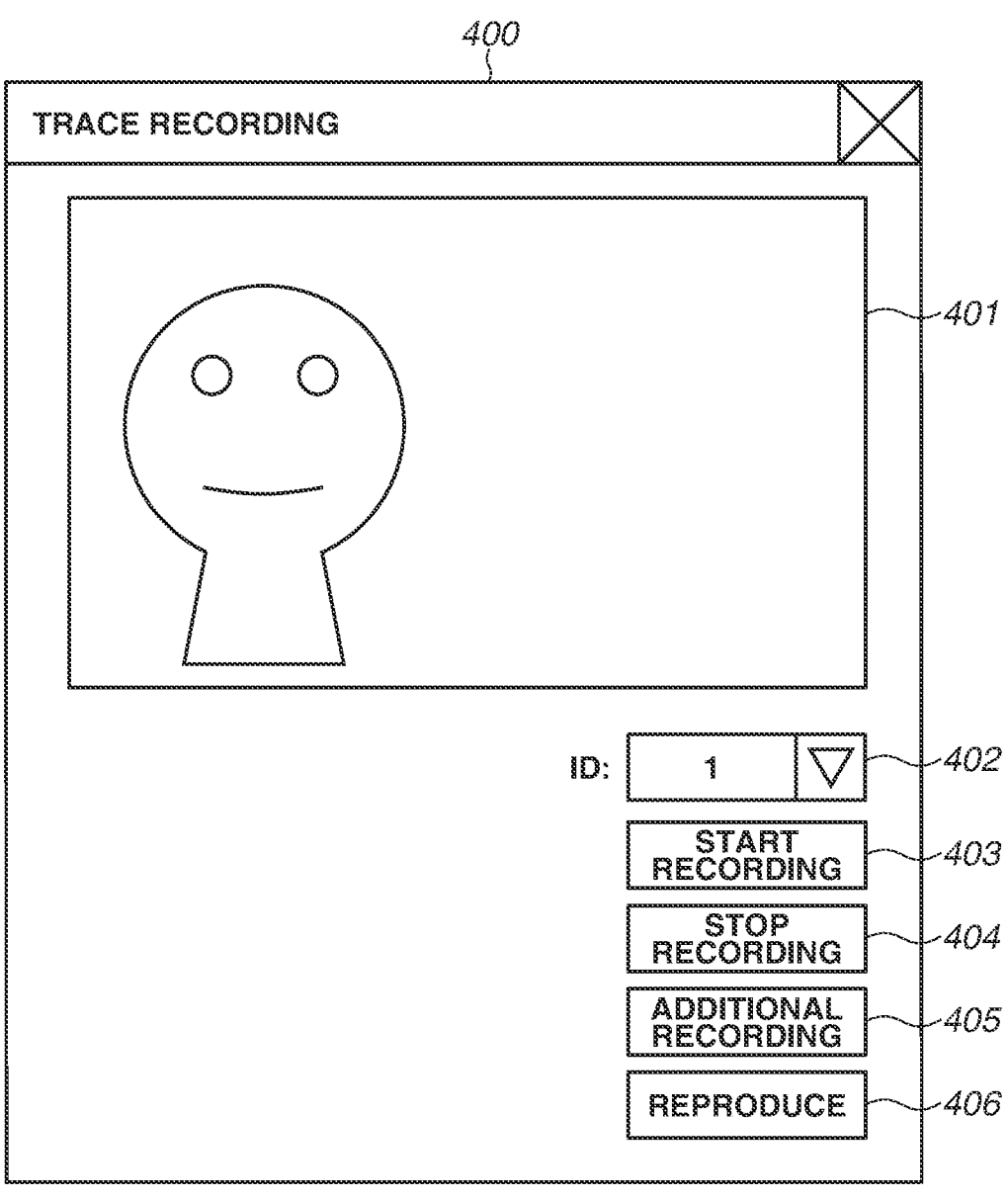
FIG. 4 is a diagram illustrating a graphical user interface (GUI) of trace recording.

Trace recording according to the present exemplary embodiment will be described with reference to FIG. 4. A GUI 400 in FIG. 4 is a setting screen for trace recording that is to be displayed on the display 210 by the display control unit 201 of the information processing apparatus 200. The GUI 400 in FIG. 4 includes a display window 401 in which an image captured by the imaging apparatus 100 is displayed, a trace identifier (ID) 402 indicating identification information of trace recording, a recording start button 403 for issuing a start instruction of trace recording, a recording stop button 404 for issuing a stop instruction of trace recording, an additional recording button 405 for issuing an update instruction of trace information, and a reproduction button 406 for issuing a reproduction instruction of trace information.

In the display window 401, an image delivered from the imaging apparatus 100 is displayed, and a live video including a series of images captured and delivered in real time, for example, is displayed. The trace ID 402 is an ID (hereinafter, trace ID) for uniquely identifying trace information recorded by trace recording, and different trace IDs are allocated to a plurality of respective different pieces of trace information. In the example in FIG. 4, by the user clicking the trace ID 402, trace IDs corresponding to respective pieces of registered trace information are displayed as a list. In addition, trace ID addition (not illustrated) can be selected in the trace ID 402. If the trace ID addition is selected, a new trace ID is issued, and the new trace ID is displayed in a selected state in the trace ID 402. For example, a list of ten fixed trace IDs may be created in the trace ID 402. In this case, a list of ten trace IDs at most is created including a trace ID corresponding to unregistered trace information.

In a case where the recording start button 403 is pressed by the user, trace recording associated with a trace ID currently selected in the trace ID 402 is started. Before pressing the recording start button 403, the user is to control an operation state of the imaging apparatus 100 to be a desired start state.

For example, the user performs an operation for changing a pan value, a tilt value, and a zoom value to values at a start position of trace recording. If trace recording is started, the user performs an operation for changing an image capturing range, for example, while checking a real-time video displayed in the display window 401. By control commands of the imaging apparatus 100 being sequentially generated in accordance with user operations, and the control commands being transmitted to the imaging apparatus 100, the control of the imaging apparatus 100 is implemented. For example, in a case where a user operation of tilting the joystick 220 in a left-right direction is performed, a control command for changing a pan value is generated and transmitted to the imaging apparatus 100. Alternatively, in a case where a user operation of tilting the joystick 220 in an up-down direction is performed, a control command for changing a tilt value is generated and transmitted to the imaging apparatus 100. In the trace recording, a recording unit 205 records the transition of parameters of the imaging apparatus 100 that are sequentially changed in accordance with user operations, as trace information associated with a currently-selected trace ID.

By the recording stop button 404 being pressed by the user, trace recording stops, and a recording unit 205 stores trace information recorded from a start to a stop of trace recording, into a trace information table. An upper limit of a trace recording time may be present. In this case, in a case where an elapsed time from the start of trace recording reaches the upper limit, trace recording stops without the press of the recording stop button 404, and the recording unit 205 stores sequentially-recorded trace information into the trace information table.

By the additional recording button 405 being pressed by the user, trace information recorded in association with a trace ID currently selected in the trace ID 402 can be updated. The case where the additional recording button 405 is pressed will be described below with reference to FIG. 6.

In a case where the reproduction button 406 is pressed by the user, the system control unit 203 reads out trace information recorded in association with a trace ID currently selected in the trace ID 402, and executes the following processing. More specifically, referring to the trace information, the system control unit 203 controls the imaging apparatus 100 in such a manner as to trace the transition of parameters that are made in accordance with user operations performed in trace recording. In the following description, processing of controlling the imaging apparatus 100 in such a manner as to trace the transition of parameters that are made in accordance with user operations, referring to the trace information in this manner will be referred to as trace reproduction.

A trace information table will be described with reference to FIG. 5. A trace information table 500 illustrated in FIG. 5 is an example of a table for storing trace information. A trace ID 501 and trace information 502 obtained by trace recording are stored in the trace information table 500 in association with each other.

The trace ID 501 is an ID for uniquely identifying trace information, and is the same as an ID displayed in the trace ID 402. The trace information 502 is a record of operations of the imaging apparatus 100 that are performed by the user during a predetermined period, and is referred to at the time of trace reproduction. FIG. 5 illustrates an example in which the trace information 502 is recorded in a Java Script Object Notation (hereinafter, referred to as JSON) format, but the trace information 502 may be recorded in another format. An object in the JSON format can represent a correspondence relationship by arranging a colon ":" between a name and a value. In the example in FIG. 5, a name "start" indicates a start time point of trace recording, and a state of the imaging apparatus 100 at the start time point of trace recording is indicated as a value corresponding to the "start". In the example in FIG. 5, as the state of the imaging apparatus 100 at the start time point, a pan value is set to 100°, a tilt value is set to 20°, and a zoom value is set to 60°. A name "end" indicates an end time point of trace recording, and a state of the imaging apparatus 100 at the end time point of trace recording is indicated as a value corresponding to the "end". As the state of the imaging apparatus 100, it is indicated that an elapsed time from the start to the end of trace recording is 2050 ms, a pan value of the imaging apparatus 100 at the end time point is set to 40°, a tilt value is set to 50°, and a zoom value is set to 20°.

A name "elapsed time" indicates an elapsed time from the start time point of trace recording. In FIG. 5, elapsed times from 100 ms to 2000 ms are recorded in chronological order at 100 ms intervals as values. The recording interval is not limited to 100 ms, and may be another value.

A name "command" indicates information regarding a control command transmitted by the information processing apparatus 200 to the imaging apparatus 100. In the "command", pan.speed indicates a speed (hereinafter, pan speed) at which a pan value is changed, and pan.dir indicates a direction (hereinafter, pan direction) in which the pan drive unit 103 is driven. That is, pan.speed and pan.dir designate a pan speed and a pan direction as the control command. In the example illustrated in FIG. 5, in a control command transmitted when an "elapsed time" is 100 ms, a pan speed is set to 10°/s, and a pan direction is set to a left direction. In a case where the imaging apparatus 100 acquires the control command, the imaging apparatus 100 performs control of changing a pan value in such a manner as to drive the pan drive unit 103 in the left direction at the pan speed of 10°/s. In the control command, settings regarding a tilt value can also be made, and tilt.speed indicates a speed (hereinafter, tilt speed) at which a tilt value is changed, and tilt.dir indicates a direction (hereinafter, tilt direction) in which the tilt drive unit 104 is driven. In the example illustrated in FIG. 5, in a control command transmitted when an "elapsed time" is 100 ms, a tilt speed is set to 2°/s, and a tilt direction is set to an up direction. Parameters included in the control command are not limited to a parameter related to a pan value and a parameter related to a tilt value, and another parameter may be included. For example, a parameter related to a zoom value of the imaging apparatus 100, a parameter of a focus value, a parameter of white balance, a parameter of an exposure value, and a parameter of image quality may be included.

Figure 6:
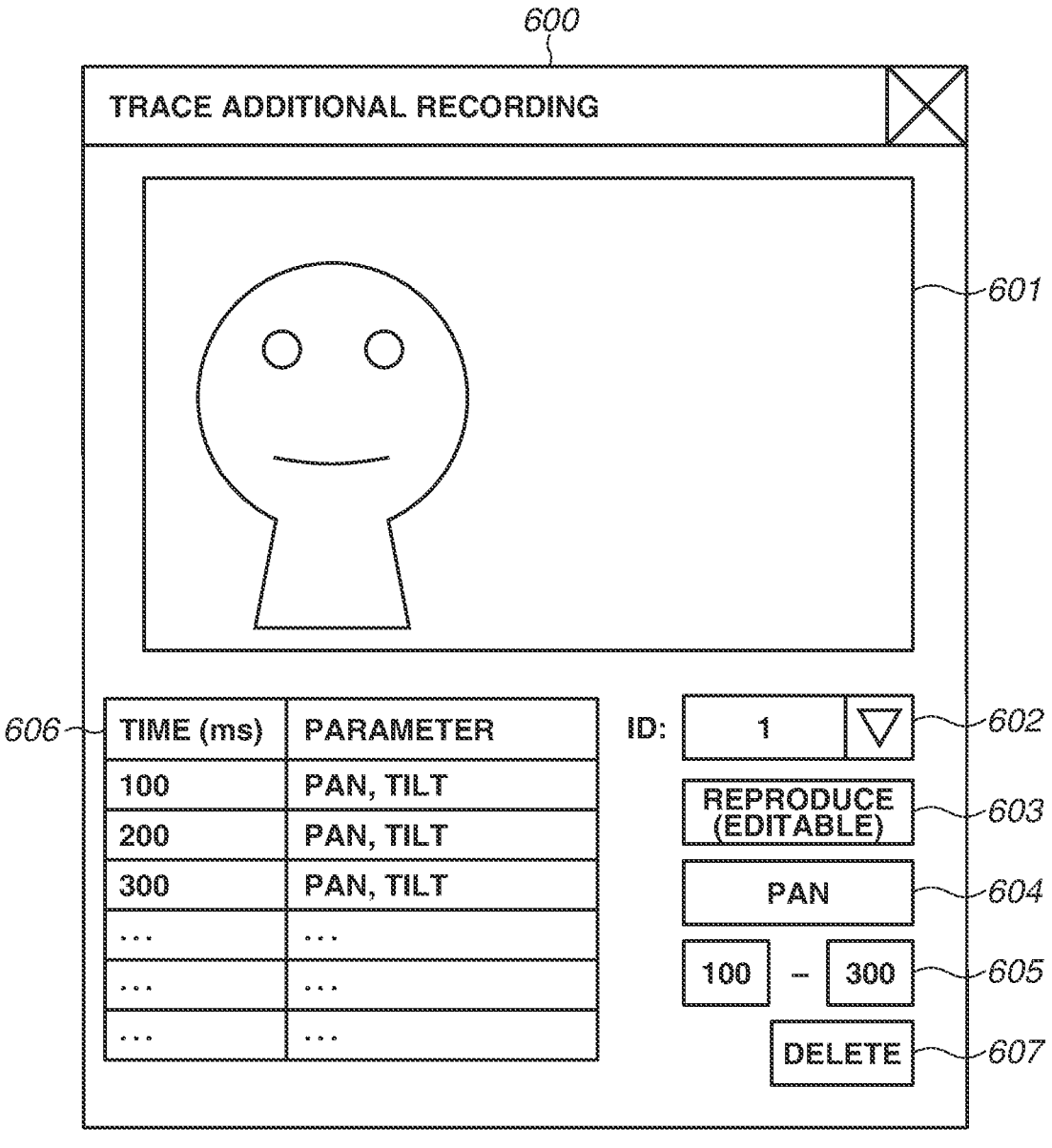
FIG. 6 is a diagram illustrating a GUI for update of trace information.

Hereinafter, update of trace information will be described with reference to FIGS. 6 to 8. A GUI 600 illustrated in FIG. 6 is a setting screen for trace information update that is to be displayed by the display control unit 201 in accordance with the additional recording button 405 in the GUI 400 illustrated in FIG. 4, being pressed by a click operation performed by the user. By operating the GUI 600, the user can further record an additional parameter in currently-recorded trace information. The GUI 600 illustrated in FIG. 6 includes a display window 601 in which an image captured by the imaging apparatus 100 is displayed, a trace ID 602 indicating identification information of trace recording, a reproduction (editable) button 603 for editing trace information, a deletion control input 604 for designating a parameter to be deleted, a deletion time designation 605 for designating a time of a parameter to be deleted, a trace table 606 indicating a parameter currently recorded in trace information, and a deletion button 607.

Similarly to the display window 401, in the display window 601, an image delivered from the imaging apparatus 100 is displayed, and a video including a series of images captured and delivered in real time, for example, is displayed.

The trace ID 602 is a trace ID for uniquely identifying trace information recorded by trace recording. In the example in FIG. 6, by the user clicking the trace ID 602, currently-registered trace IDs are displayed as a list. IDs to be displayed as a list in the trace ID 602 is stored in the trace information table 500. Furthermore, trace ID addition (not illustrated) can be selected in the trace ID 602. If the trace ID addition is selected, a new trace ID is issued, and the new trace ID is displayed in a selected state in the trace ID 602. For example, a list of ten fixed trace IDs may be created in the trace ID 602. In this case, a list of ten trace IDs at most is created including a trace ID corresponding to unregistered trace information.

By the reproduction (editable) button 603 being pressed by the user, trace reproduction is performed by calling up trace information associated with a trace ID currently selected in the trace ID 602, from the trace information table 500. In the example illustrated in FIG. 6, because a trace ID "1" is selected, trace reproduction of reading out trace information associated with the trace ID "1", from the trace information table 500, and tracing the control of the imaging apparatus 100 that is recorded in the trace information is performed. If the trace reproduction is started, while checking a live video displayed in the display window 601, the user performs, at an arbitrary timing, an operation of controlling a parameter related to the control of the imaging apparatus 100 that is desired to be additionally recorded. The operation reception unit 202 receives the operation performed at the time, and an update unit 206 updates trace information in such a manner as to add the newly-added parameter. If the trace reproduction is completed, the recording unit 205 records trace information updated by the update unit 206, into the trace information table 500.

The update of trace information that is based on a user operation added in the trace reproduction will be described with reference to FIG. 7. A case where the user's control of a parameter related to a zoom value is further added while trace reproduction is being performed in such a manner as to trace time-series transition of parameters of pan values and parameters of tilt values included in the trace information 502 associated with the trace ID "1" illustrated in FIG. 5 will be assumed. FIG. 7 illustrates trace information updated based on the control of a parameter related to a zoom value that has been added at the time.

In the trace information table 500 illustrated in FIG. 7, the trace information 502 recorded in association with the trace ID 501 has been updated in such a manner that a parameter of a zoom value is newly added in addition of the currently-recorded parameters of pan values and parameters of tilt values.

A case where trace reproduction of the trace information 502 associated with the trace ID "1" is started in response to a user instruction will be assumed. At this time, the system control unit 203 reads out a control command corresponding to a current elapsed time, from trace information based on an elapsed time from a start time point of trace reproduction, and sequentially transmits the control command to the imaging apparatus 100. For example, in a case where the current elapsed time from a start time point of trace reproduction is 500 ms, the system control unit 203 generates a control command including "command" (pan.speed=50&pan.dir=left&tilt.speed=10&tilt.dir=up . . . ), and corresponding to the "elapsed time 500 ms", and transmits the control command to the imaging apparatus 100. A time point at which an elapsed time since trace reproduction has been started becomes 1620 ms during the trace reproduction in which an image capturing range of the imaging apparatus 100 is thus controlled in such a manner as to trace the control performed by a user operation will be assumed.

At this time, the system control unit 203 transmits a control command for controlling a parameter related to a zoom value based on a user operation of operating a zoom value, from the information processing apparatus 200 to the imaging apparatus 100. As illustrated in FIG. 7, the update unit 206 has added a parameter 701 related to a zoom value that is based on a user operation newly added during the trace reproduction. The parameter 701 for controlling a zoom value includes zoom.speed indicating a speed (zoom speed) at which a zoom value is changed, and zoom.dir indicating a side toward which a zoom value is changed, out of a telephoto end and a wide-angle end. In the example illustrated in FIG. 7, the newly-added parameter 701 indicates that zoom.speed is set to 50 and zoom.dir is set to the telephoto end. Furthermore, at a time point at which an elapsed time since trace reproduction has been started becomes 1780 ms, based on a user operation of controlling a parameter of a zoom value, the system control unit 203 transmits a control command for stopping the control of the zoom value, to the imaging apparatus 100. At this time, the update unit 206 adds a parameter 702 of a zoom value that is based on the newly-added control of the zoom value, to the trace information 502. Because zoom.speed is set to 0 at the time as the parameter 702 of the zoom value, it is indicated that the imaging apparatus 100 is to stop the control of the zoom value. As illustrated in FIG. 7, after the update of trace information, the system control unit 203 executes trace reproduction using the updated trace information in accordance with a reproduction instruction of the trace information that is issued by the user.

As described above, during the reproduction of trace information indicating time-series transition during a predetermined period of a first parameter related to the control of the imaging apparatus 100 (for example, a parameter related to a pan value), the update unit 206 executes the following processing. More specifically, in a case where a user operation for controlling the imaging apparatus 100 using a second parameter (for example, a parameter related to a zoom value) that is a parameter related to the control of the imaging apparatus 100, and different from the first parameter is performed during the trace reproduction of the trace information, the update unit 206 updates the trace information in such a manner as to add the second parameter. In the example illustrated in FIG. 7, the update unit 206 updates trace information in which a parameter of a pan value and a parameter of a tilt value are recorded, in such a manner as to add a parameter of a zoom value. Examples of the first parameter and the second parameter include a parameter related to a pan value, a parameter related to a tilt value, a parameter related to a zoom value, a parameter of a focus value, a parameter of an exposure value, a parameter of white balance, and a parameter related to image quality.

In the above-described example, the description has been given of an example in which, during the reproduction of trace information including a first parameter, in accordance with a user operation of performing control using a second parameter different from the first parameter, the update unit 206 updates the trace information in such a manner as to include the second parameter, but the update of trace information is not limited to this. For example, during the reproduction of trace information including a first parameter, in accordance with a user operation of performing control using the first parameter, the update unit 206 may update the trace information for the first parameter. For example, a case where the first parameter is a parameter related to a pan value will be assumed. As indicated in the trace information associated with the trace ID "1" in FIG. 5, parameters related to a series of pan values are recorded in the trace information. A case where a control command for setting a pan speed to 20°/s and a pan direction to the left direction is then transmitted to the imaging apparatus 100 based on a user operation at a timing at which 300 ms, for example, elapses from the start of trace reproduction during the reproduction of the trace information will be assumed. At this time, the update unit 206 updates {"elapsed time":300,"command": "pan.speed=30&pan.dir=left&tilt.speed=6&tilt.dir=up . . . "} in the trace information illustrated in FIG. 5, to {"elapsed time":300,"command": "pan.speed=20&pan.dir=left&tilt.speed=6&tilt.dir=up . . . "}.

In this manner, a parameter of the same type as a parameter recorded in trace information may be updated in accordance with a user operation performed during trace reproduction.

The description will return to FIG. 6. Via the deletion control input 604 in the GUI 600, the user can input a parameter desired to be deleted from trace information recorded in association with a trace ID (trace ID "1" in the example in FIG. 6) currently selected in the trace ID 602. For example, in a case where a parameter of a pan value is desired to be deleted, "pan" is input to the deletion control input 604.

Via the deletion time designation 605, the user designates a time during which the parameter designated via the deletion control input 604 is desired to be deleted from trace information recorded in association with a trace ID (trace ID "1" in the example in FIG. 6) currently selected in the trace ID 602. In the example illustrated in FIG. 6, it is indicated that parameters of pan values that have been recorded within a time range from 100 ms to 300 ms are selected as parameters to be deleted from trace information.

In the trace table 606, based on trace information associated with a trace ID currently selected in the trace ID 602, elapsed times and types of control target parameters corresponding to the respective elapsed times are displayed. Specifically, the display control unit 201 reads out the trace information 502 illustrated in FIG. 5 that is associated with the trace ID "1", and displays elapsed times included in the trace information 502, and types of control target parameters corresponding to the respective elapsed times, in the trace table 606 as a list. In the example of the trace information 502 illustrated in FIG. 5, because parameters of pan values and parameters of tilt values are included, as illustrated in FIG. 6, "Pan, Tilt" is displayed in the trace table 606 for each elapsed time. In a case where the deletion button 607 is pressed by the user, based on a parameter input via the deletion control input 604 and a time range input via the deletion time designation 605, the update unit 206 deletes information regarding the parameters included the trace information that have been recorded within the time range. In the example illustrated in FIG. 6, from the trace information illustrated in FIG. 5 and associated with the trace ID "1" currently selected in the trace ID 602, the update unit 206 deletes parameters of pan values that have been recorded within the time range from 100 ms to 300 ms. Trace information obtained in a case where parameters of pan values are deleted by the update unit 206 in this manner will be described with reference to FIG. 8. As illustrated in FIG. 8, the update unit 206 has deleted parameters related to pan values (pan.speed and pan.dir) that have been recorded within the "elapsed times" 100 to 300 ms, from the trace information recorded in association with the trace ID "1" in FIG. 5. As described above, the information processing apparatus 200 according to the present exemplary embodiment can delete an arbitrary parameter recorded within an arbitrary time range, from already-recorded trace information in accordance with a user operation. The display control unit 201 may display the trace information table 500 on the display 210. At this time, the update unit 206 may delete an arbitrary parameter recorded within an arbitrary time range, from recorded trace information in accordance with a user operation performed on the displayed trace information table 500.

Information processing according to the present exemplary embodiment will be described with reference to a flow illustrated in FIG. 9.

Figure 9:
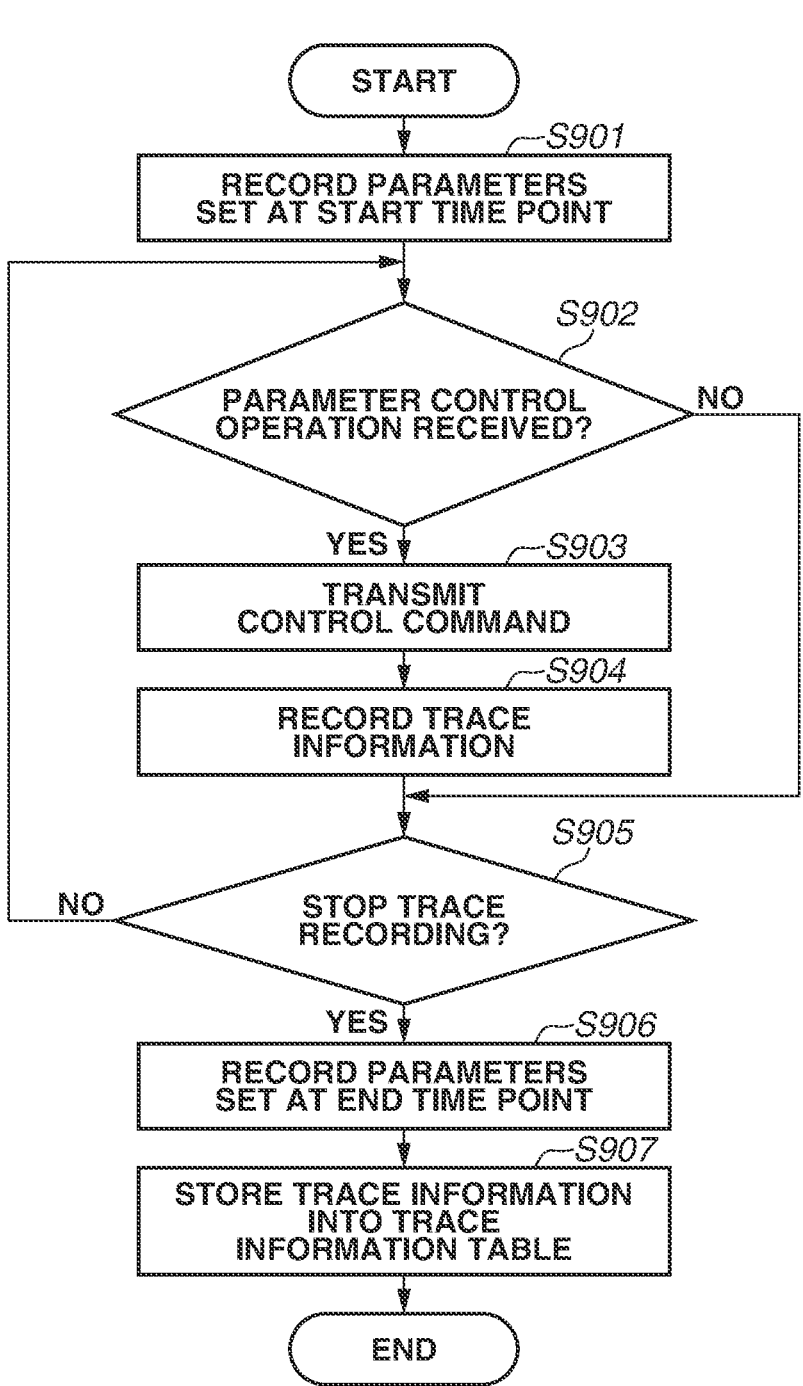
FIG. 9 is a flowchart illustrating a flow of processing of trace recording.

By executing the processing in the flow illustrated in FIG. 9, the information processing apparatus 200 can execute trace recording and record trace information. The processing in the flow illustrated in FIG. 9 is executed by a functional block of the information processing apparatus 200 that is illustrated in FIG. 3 and implemented by the CPU 1500 of the information processing apparatus 200 executing a computer program stored in the ROM 1520 of the information processing apparatus 200, for example. The processing in the flow illustrated in FIG. 9 is started in accordance with the press of the recording start button 403 in the GUI 400.

In step S901, the recording unit 205 records, into trace information, parameters set in a state where the imaging apparatus 100 is at a trace recording start time point. In this step, the recording unit 205 records parameters set in the state at the trace recording start time point, for all types of controllable parameters of the imaging apparatus 100. For example, in a case where a parameter of a pan value of the imaging apparatus 100, a parameter of a tilt value of the imaging apparatus 100, and a parameter of a zoom value of the imaging apparatus 100 can be controlled, the recording unit 205 records information regarding the parameters of the imaging apparatus 100 that are set at the trace recording start time point, into trace information. Information recorded in this manner corresponds to {"start":{"pan":100,"tilt":20, "zoom":60, . . . }} illustrated in FIG. 5, for example. Parameters recorded in this step are not limited to parameters such as a pan value, a tilt value, and a zoom value, and may be parameters such as a focus value, an exposure value, image quality, and white balance, for example.

Next, in step S902, the system control unit 203 determines whether the operation reception unit 202 has received an operation of a parameter related to the control of the imaging apparatus 100 that has been performed by the user. Examples of the parameter related to the control of the imaging apparatus 100 include a parameter of a pan value of the imaging apparatus 100, a parameter of a tilt value of the imaging apparatus 100, a parameter of a zoom value of the imaging apparatus 100, and a parameter of a focus value of the imaging apparatus 100.

The parameters are not limited to these parameters, and another parameter related to the control of the imaging apparatus 100 may be included. In a case where it is determined that the operation reception unit 202 has received an operation of a parameter related to the control of the imaging apparatus 100 that has been performed by the user (YES in step S902), the processing proceeds to step S903. On the other hand, in a case where it is determined that the operation reception unit 202 has not received an operation of a parameter related to the control of the imaging apparatus 100 that has been performed by the user (NO in step S902), the processing proceeds to step S905.

In step S903, the system control unit 203 generates a control command that is based on the operation performed by the user, and transmits the control command to the imaging apparatus 100. For example, in a case where a user instruction for setting a pan speed to 10°/s and a pan direction to the left direction is input, the system control unit 203 generates a control command including pan.speed=10&pan.dir=left, and transmits the control command to the imaging apparatus 100. The imaging apparatus 100 that has acquired the control command controls pan values in such a manner as to drive the pan drive unit 103 in the left direction at the pan speed of 10°/s. Next, in step S904, the recording unit 205 records an elapsed time since trace recording has started, and information regarding the control command transmitted in step S903, into trace information in association with each other. For example, in a case where an elapsed time since trace recording has started is 500 ms, and a control command includes pan.speed=10&pan.dir=left, information indicating {"elapsed time":500,"command": "pan.speed=10&pan.dir=left"} is recorded into trace information.

In step S905, the system control unit 203 determines whether trace recording has been stopped. For example, in a case where the recording stop button 404 in the GUI 400 has been pressed by a user operation, trace recording is stopped. In a case where it is determined that trace recording has been stopped (YES in step S905), the processing proceeds to step S906. On the other hand, in a case where it is determined that trace recording has not been stopped (NO in step S905), the processing returns to step S901, and processing in step S901 is executed again.

Next, in step S906, the recording unit 205 records information regarding parameters of the imaging apparatus 100 that are set at the time point at which trace recording has stopped, into trace information. The information regarding parameters of the imaging apparatus 100 that are set at the time point at which trace recording has stopped, into trace information corresponds to information ({"elapsed time": 2050,"pan":40,"tilt":50,"zoom":20, . . . }) associated with "end" in the example in FIG. 5. Next, in step S907, the recording unit 205 stores the trace information and a trace ID currently selected in the trace ID 402 in the GUI 400, into the trace information table 500 in association with each other.

Figure 10:
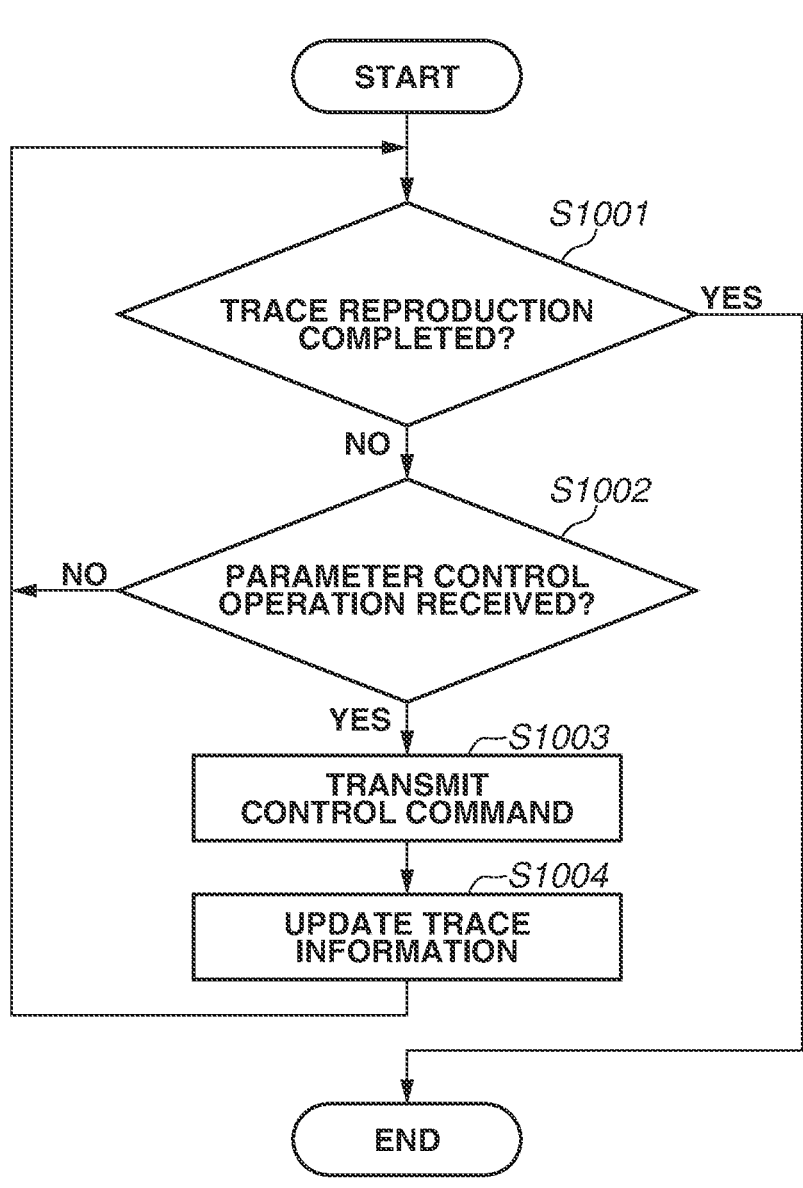
FIG. 10 is a flowchart illustrating a flow of update processing of trace recording.

Subsequently, update processing of trace information will be described with reference to a flow in FIG. 10. In the present exemplary embodiment, by executing the processing in the flow illustrated in FIG. 10, the information processing apparatus 200 can execute trace reproduction using already-recorded trace information, and update the trace information based on a user operation performed during the trace reproduction. The processing in the flow illustrated in FIG. 10 is executed by a functional block of the information processing apparatus 200 that is illustrated in FIG. 3 and implemented by the CPU 1500 of the information processing apparatus 200 executing a computer program stored in the ROM 1520 of the information processing apparatus 200, for example. The processing in the flow illustrated in FIG. 10 is started in accordance with the press of the reproduction (editable) button 603 that is performed by a user operation in a state where a trace ID associated with trace information already recorded by trace recording is selected in the trace ID 602 in FIG. 6.

First of all, in step S1001, the system control unit 203 determines whether trace reproduction has been completed. In a case where it is determined that trace reproduction has been completed (YES in step S1001), the processing in the flow illustrated in FIG. 10 is ended. On the other hand, in a case where it is determined that trace reproduction has not been completed (NO in step S1001), the processing proceeds to step S1002. The completion of trace reproduction corresponds to a state where all control commands corresponding to elapsed times recorded in trace information have already been transmitted to the imaging apparatus 100, and an elapsed time has reached the elapsed time corresponding to "end" included in the trace information.

Next, in step S1002, the system control unit 203 determines whether the operation reception unit 202 has received an operation of a parameter related to the control of the imaging apparatus 100 that has been performed by the user. Examples of the parameter related to the control of the imaging apparatus 100 include a parameter of a pan value of the imaging apparatus 100, a parameter of a tilt value of the imaging apparatus 100, a parameter of a zoom value of the imaging apparatus 100, and a parameter of a focus value of the imaging apparatus 100. The parameters are not limited to these parameters, and another parameter related to the control of the imaging apparatus 100 may be included. In a case where it is determined that the operation reception unit 202 has received an operation of a parameter related to the control of the imaging apparatus 100 that has been performed by the user (YES in step S1002), the processing proceeds to step S1003. On the other hand, in a case where it is determined that the operation reception unit 202 has not received an operation of a parameter related to the control of the imaging apparatus 100 that has been performed by the user (NO in step S1002), the processing returns to step S1001, and the processing in step S1001 is repeated.

In step S1003, the system control unit 203 generates a control command that is based on the operation performed by the user, and transmits the control command to the imaging apparatus 100. For example, in a case where a user instruction for changing a zoom speed to 50 and a zoom value toward the telephoto end side is input, the system control unit 203 generates a control command including zoom.speed=50&zoom.dir=tele, and transmits the control command to the imaging apparatus 100. The imaging apparatus 100 that has acquired the control command controls a zoom speed and a zoom value in such a manner as to change to the telephoto end side at the zoom speed of 50. In step S1004, the recording unit 205 records an elapsed time since trace recording has started, and information regarding the control command transmitted in step S1003, into trace information in association with each other. For example, in a case where an elapsed time since trace recording has started is 1620 ms, and a transmitted control command includes zoom.speed=50&zoom.dir=tele, trace information is updated in such a manner as to add information indicating {"elapsed time":1620,"command": "zoom.speed=50&zoom.dir=tele"}, to trace information used in the current trace reproduction. After the processing in step S1004, the processing returns to step S1001, and the processing in step S1001 is repeated.

As described above, during the reproduction of trace information already recorded by trace recording, the information processing apparatus 200 according to the present exemplary embodiment can update the trace information in accordance with the control of a parameter of the imaging apparatus 100 that is performed by the user. With this configuration, even in a case where a plurality of types of parameters are desired to be recorded by trace recording, the user does not need to control and record all the parameters at a time, and can record the parameters through a plurality of steps. With this configuration, according to the present exemplary embodiment, it is possible to reduce load on the user that is related to trace recording.

In a second exemplary embodiment, processing of updating trace information in such a manner as to add a parameter added while trace reproduction is paused will be described. In the present exemplary embodiment, a part different from the first exemplary embodiment will be mainly described, and components and processing that are the same as or equivalent to those in the first exemplary embodiment are assigned the same reference numerals, and the redundant description will be omitted.

Figure 11:
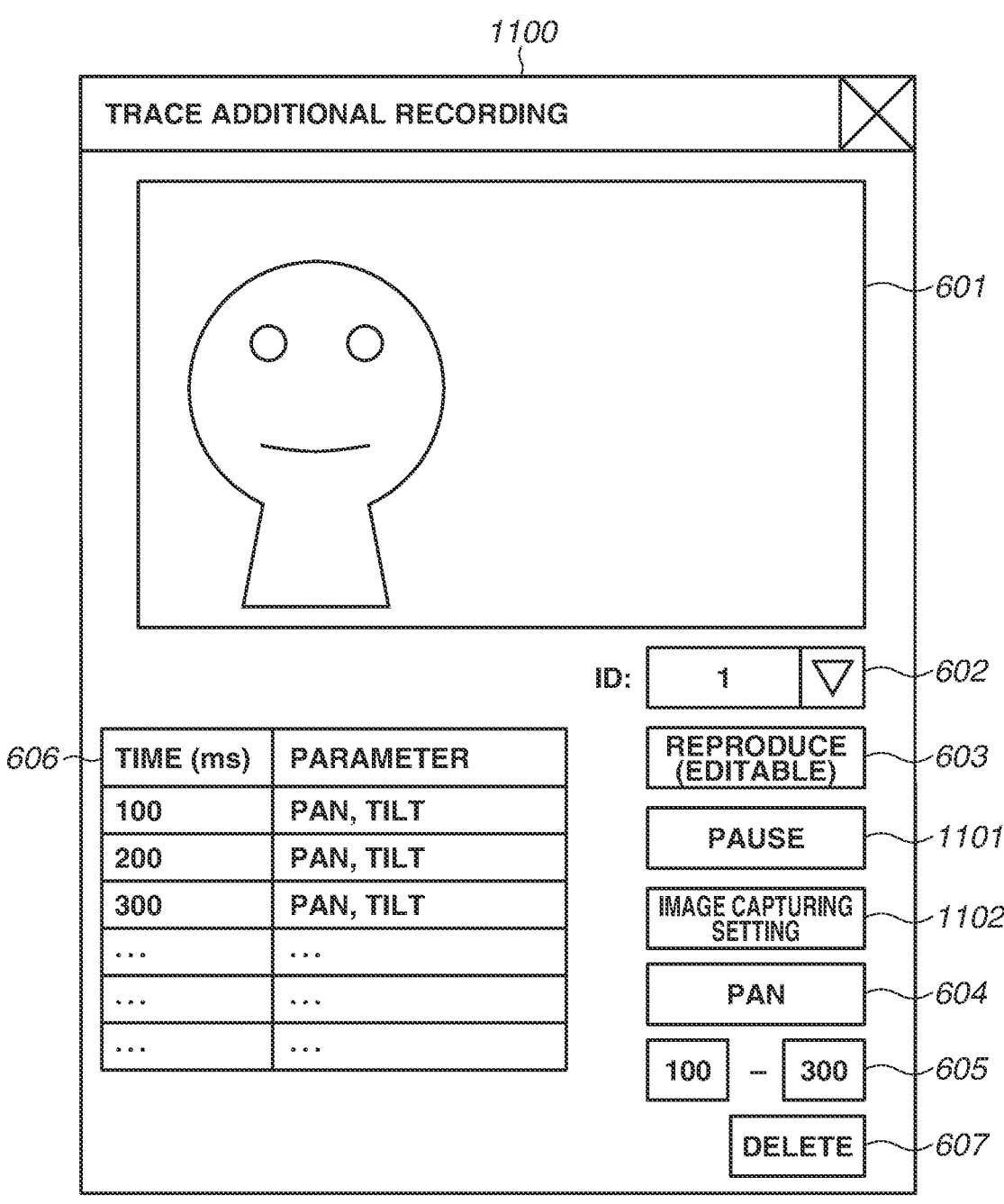
FIG. 11 is a diagram illustrating a GUI for update of trace information.

A GUI for update of trace information according to the present exemplary embodiment will be described with reference to FIG. 11. A GUI 1100 illustrated in FIG. 11 is a GUI for trace information update according to the present exemplary embodiment, and a pause button 1101 and an image capturing setting button 1102 are newly added to the GUI 600 illustrated in FIG. 6. Because the display window 601, the trace ID 602, the reproduction (editable) button 603, the deletion control input 604, the deletion time designation 605, the trace table 606, and the deletion button 607 in the GUI 1100 in FIG. 11 are similar to those described with reference to FIG. 6, the description will be omitted.

By the pause button 1101 being pressed by the user during trace reproduction performed in accordance with the press of the reproduction (editable) button 603, the system control unit 203 pauses currently-ongoing trace reproduction. While the trace reproduction is paused, even in a case where the operation reception unit 202 receives a user operation of controlling parameters corresponding to an image capturing range, such as a pan value, a tilt value, and a zoom value, the system control unit 203 does not control the imaging apparatus 100 in accordance with the operation. At this time, the system control unit 203 does not update trace information based on the operation. On the other hand, a case where an operation of a parameter (hereinafter, image capturing parameter) that is a parameter different from a parameter corresponding to an image capturing range, and is related to image capturing of the imaging apparatus 100 is received while the trace reproduction is paused will be assumed. At this time, the system control unit 203 transmits a control command for controlling the imaging apparatus 100 using the image capturing parameter, to the imaging apparatus 100, and updates the trace information in such a manner as to include the image capturing parameter. In a case where the pause button 1101 is pressed and trace reproduction shifts to pause, and then the reproduction (editable) button 603 is pressed, the paused trace reproduction is restarted.

By the image capturing setting button 1102 being pressed by the user while trace reproduction is paused, the GUI transitions to a GUI for an image capturing parameter setting. A GUI 1200 in FIG. 12 indicates a GUI for an image capturing parameter setting. The GUI 1200 in FIG. 12 includes a display window 1201 in which a live video captured and delivered in real time by the imaging apparatus 100 is displayed, a return button 1202 for returning to the screen of the GUI 1100, and a setting window 1203 for an image capturing parameter setting.

The setting window 1203 includes setting items of a plurality of image capturing parameters with different types. Image capturing parameters according to the present exemplary embodiment include a parameter of an exposure value, a parameter of white balance, a parameter of image quality, and a parameter of a focus value, but another parameter may be included. The setting window 1203 illustrated in FIG. 12 includes a setting item 1204 for controlling a parameter of an exposure value, a setting item 1205 for controlling a parameter of white balance, a setting item 1206 for controlling a parameter of image quality, and a setting item 1207 for controlling a parameter of a focus value. In a state where trace reproduction is paused and control of an image capturing range is paused, by operating an arbitrary setting item included in the setting window 1203 in the GUI 1200, the user can control a desired image capturing parameter. For example, a case where the setting item 1205 is operated by the user will be assumed. In accordance with the operation reception unit 202 receiving a user operation of designating a parameter of white balance, in the setting item 1205, the system control unit 203 generates a control command that is based on the designated parameter, and transmits the control command to the imaging apparatus 100. For example, in a case where a user instruction of parameters of white balance including an R gain of 125, a B gain of 256, and a G gain of 0 is input, the system control unit 203 generates a control command including "wb.rgain=125&wb.bgain=256&wb.ggain=0" in such a manner as to obtain the parameters, and transmits the control command to the imaging apparatus 100. At this time, the update unit 206 additionally records information regarding an elapsed time until trace reproduction is paused since trace reproduction has been started, and information regarding the control command including "wb.rgain=125&wb.bgain=256&wb.ggain=0", into trace information currently used in trace reproduction, in association with each other. FIG. 13 illustrates trace information updated by additional recording in this manner. In the example illustrated in FIG. 13, a case where an elapsed time until trace reproduction is paused since trace reproduction has been started is 1780 ms is assumed. At this time, as indicated by a parameter 1301 in FIG. 13, the update unit 206 has added information regarding the elapsed time of 1780 ms and a control command for controlling white balance and including "wb.rgain=125&wb.bgain=256&wb.ggain=0" that has been transmitted to the imaging apparatus 100, into trace information associated with the trace ID "1", in association with each other. As illustrated in FIG. 13, after the update of trace information, the system control unit 203 executes trace reproduction using the updated trace information in accordance with a reproduction instruction of the trace information that is issued by the user.

Figure 14:
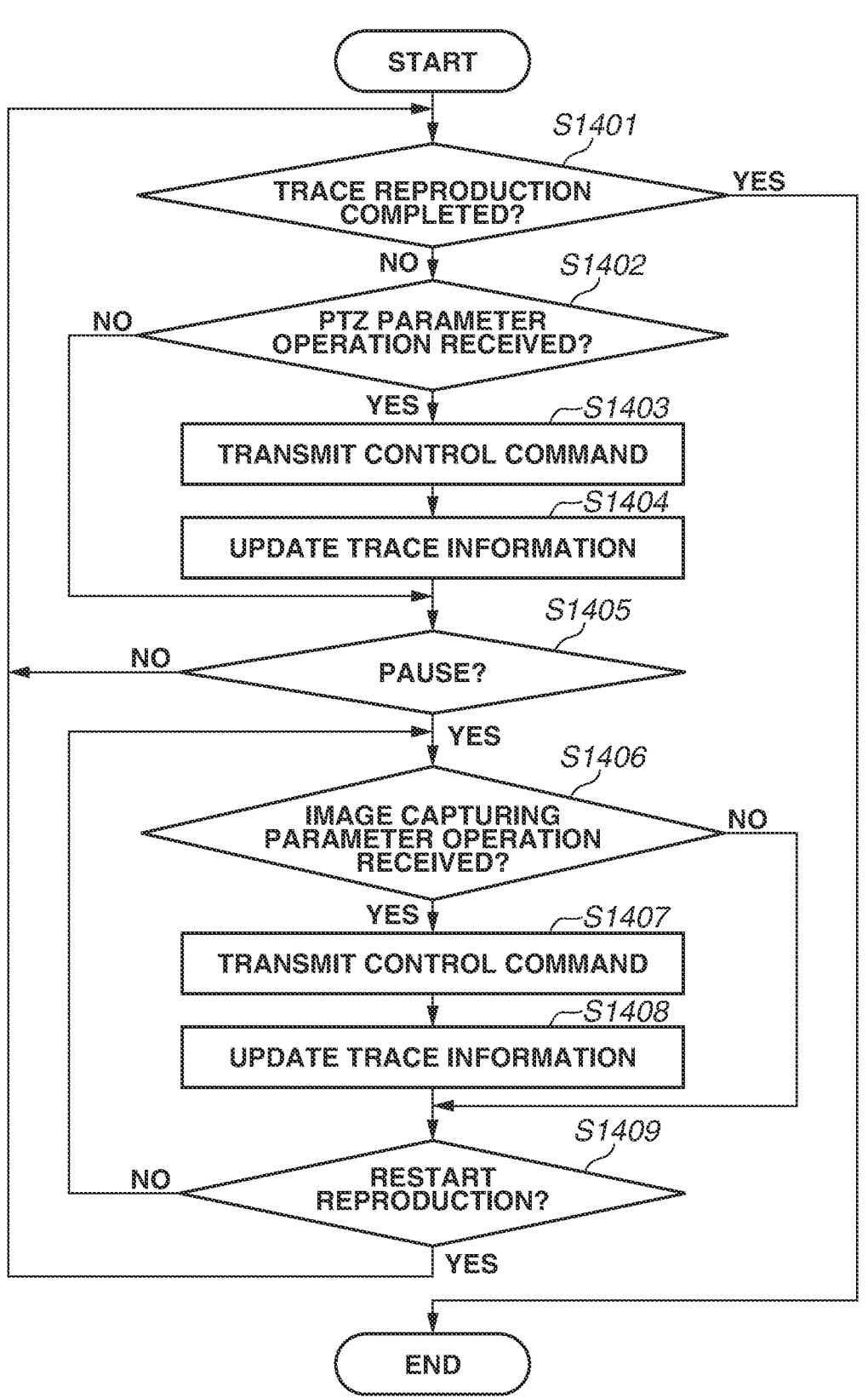
FIG. 14 is a flowchart illustrating a flow of update processing of trace recording.

The update of trace information according to the present exemplary embodiment will be described with reference to processing in a flow illustrated in FIG. 14. The processing in the flow illustrated in FIG. 14 is executed by a functional block of the information processing apparatus 200 that is illustrated in FIG. 3 and implemented by the CPU 1500 of the information processing apparatus 200 executing a computer program stored in the ROM 1520 of the information processing apparatus 200, for example. The processing in the flow illustrated in FIG. 14 is started in accordance with the press of the reproduction (editable) button 603 that is performed by a user operation in a state where a trace ID associated with trace information already recorded by trace recording is selected in the trace ID 602 in FIG. 11.

In step S1401, the system control unit 203 determines whether trace reproduction has been completed. In a case where it is determined that trace reproduction has been completed (YES in step S1401), the processing in the flow illustrated in FIG. 14 is ended. On the other hand, in a case where it is determined that trace reproduction has not been completed (NO in step S1401), the processing proceeds to step S1402.

In step S1402, the system control unit 203 determines whether the operation reception unit 202 has received an operation of at least any parameter (hereinafter, PTZ parameter) of a pan value, a tilt value, and a zoom value. In a case where it is determined that the operation reception unit 202 has received an operation of a PTZ parameter that has been performed by the user (YES in step S1402), the processing proceeds to step S1403. On the other hand, in a case where it is determined that the operation reception unit 202 has not received an operation of a PTZ parameter that has been performed by the user (NO in step S1402), the processing proceeds to step S1405.

In step S1403, the system control unit 203 generates a control command of a PTZ parameter and transmits the control command to the imaging apparatus 100. For example, in a case where a user instruction for changing a zoom speed to 50 and a zoom value toward the telephoto end side is input, the system control unit 203 generates a control command including zoom.speed=50&zoom.dir=tele, and transmits the control command to the imaging apparatus 100. The imaging apparatus 100 that has acquired the control command controls a zoom speed and a zoom value in such a manner as to change to the telephoto end side at the zoom speed of 50. In step S1404, the recording unit 205 records an elapsed time since trace recording has started, and information regarding the control command transmitted in step S1403, into trace information in association with each other. For example, in a case where an elapsed time since trace recording has started is 1620 ms, and a transmitted control command includes zoom.speed=50&zoom.dir=tele, trace information is updated in such a manner as to add information indicating {"elapsed time":1620,"command": "zoom.speed=50&zoom.dir=tele"}, to trace information used in the current trace reproduction.

In step S1405, the system control unit 203 determines whether the pause button 1101 illustrated in FIG. 11 has been pressed by the user. In a case where it is determined that the pause button 1101 has been pressed by the user (YES in step S1405), the processing proceeds to step S1406. In a case where it is determined that the pause button 1101 has been pressed by the user (YES in step S1405), to pause trace reproduction, the system control unit 203 generates a control command for pausing the control of an image capturing range, and transmits the control command to the imaging apparatus 100. The imaging apparatus 100 pauses trace reproduction based on the transmitted control command, and also stops the control of an image capturing range. In a case where it is determined that the pause button 1101 has not been pressed by the user (NO in step S1405), the processing returns to step S1401, and the processing in step S1401 is repeated.

Figure 12:
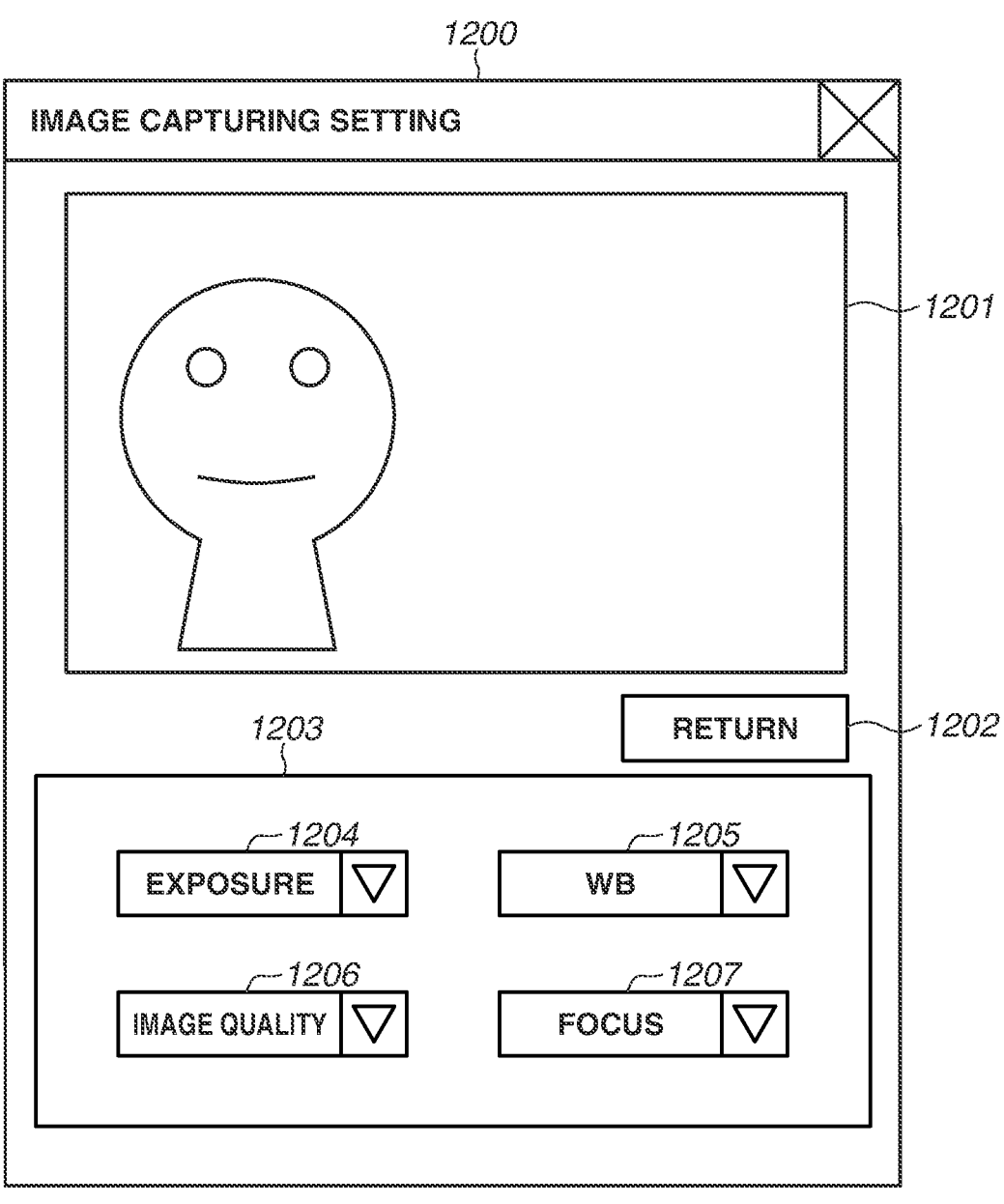
FIG. 12 is a diagram illustrating a GUI for setting of an image capturing parameter.

In step S1406, the system control unit 203 determines whether an operation of any of image capturing parameters corresponding to the setting items 1204 to 1207 included in the setting window 1203 in FIG. 12 has been received. In a case where it is determined that an operation of an image capturing parameter has been received (YES in step S1406), the processing proceeds to step S1407. On the other hand, in a case where it is determined that an operation of an image capturing parameter has not been received (NO in step S1406), the processing proceeds to step S1409.

In step S1407, system control unit 1407 generates a control command that is based on a user operation of an image capturing parameter, and transmits the control command to the imaging apparatus 100. For example, in a case where a user instruction of parameters of white balance including an R gain of 125, a B gain of 256, and a G gain of 0 is input, the system control unit 203 generates a control command including "wb.rgain=125&wb.bgain=256&wb.ggain=0" in such a manner as to obtain the parameters, and transmits the control command to the imaging apparatus 100. Next, in step S1408, the update unit 206 updates trace information in such a manner as to add information regarding an elapsed time until trace reproduction is paused since trace reproduction has been started and information regarding the control command transmitted in step S1407, to trace information currently used in trace reproduction, in association with each other. Trace information associated with the trace ID "1" in FIG. 13 is trace information updated by the update unit 206 in a case where the elapsed time is 1780 ms and the control command transmitted in step S1407 includes "wb.rgain=125&wb.bgain=256&wb.ggain=0". In step S1409, the system control unit 203 determines whether the operation reception unit 202 has received the press of the reproduction (editable) button 603 illustrated in FIG. 11. In a case where it is determined that the press of the reproduction (editable) button 603 has been received (YES in step S1409), trace reproduction is restarted and the processing returns to step S1401, and the processing in step S1401 is repeated.

On the other hand, in a case where it is determined that the press of the reproduction (editable) button 603 has not been received (NO in step S1409), the processing returns to step S1406, and the processing in step S1406 is repeated.

As described above, in a case where a trace reproduction pause instruction is issued during trace reproduction, the information processing apparatus 200 according to the present exemplary embodiment pauses the trace reproduction. Then, in a case where the control of an image capturing parameter is added by a user operation while trace reproduction is paused, the information processing apparatus 200 updates trace information currently used in trace reproduction, in such a manner as to add the image capturing parameter to the trace information. With this configuration, image quality and white balance can be adjusted while trace reproduction is paused, and the adjusted settings can be reflected in trace information. In addition, it becomes unnecessary to control a plurality of different types of parameters desired to be recorded by trace recording, at a time during trace recording, and the recording can be performed through a plurality of steps. It is therefore possible to reduce load on the user that is related to trace recording.

Other Exemplary Embodiments

Next, a hardware configuration of the information processing apparatus 200 for implementing each function of the above-described exemplary embodiment will be described with reference to FIG. 15. In the following description, a hardware configuration of the information processing apparatus 200 will be described, but the imaging apparatus 100 is also implemented by a similar hardware configuration.

The information processing apparatus 200 according to the present exemplary embodiment includes the CPU 1500, a random access memory (RAM) 1510, the ROM 1520, a hard disk drive (HDD) 1530, and the I/F 1540.

The CPU 1500 includes one or more processors, circuitry, or combinations thereof, and is a central processing unit that comprehensively controls the imaging apparatus 100. The RAM 1510 temporarily stores a computer program to be executed by the CPU 1500. The RAM 1510 also provides a work area to be used when the CPU 1500 executes processing. The RAM 1510 functions as a frame memory or functions as a buffer memory, for example.

The ROM 1520 stores a program for the CPU 1500 controlling the imaging apparatus 100. The HDD 1530 is a storage device storing image data.

The I/F 1540 performs communication with an external apparatus via the network 300 in compliance with the Transmission Control Protocol/Internet Protocol (TCP/IP) or the HyperText Transfer Protocol (HTTP).

In the description of the above-described exemplary embodiments, an example in which the CPU 1500 executes processing has been described, but at least part of the processing of the CPU 1500 may be performed by dedicated hardware. For example, processing of displaying a GUI or image data on the display 210 may be executed by a graphics processing unit (GPU). Processing of reading out a program code from the ROM 1520 and loading the program code onto the RAM 1510 may be executed by a direct memory access (DMA) functioning as a transfer apparatus.

An exemplary embodiment of the present disclosure can also be implemented by processing of one or more processors reading out a program for implementing one or more functions of the above-described exemplary embodiments, and executing the program. The program may be supplied to a system or an apparatus including a processor, via a network or a storage medium.

An exemplary embodiment of the present disclosure can also be implemented by a circuit (for example, application specific integrated circuits (ASIC)) for implementing one or more functions of the above-described exemplary embodiments. Each component of the information processing apparatus 200 may be implemented by hardware illustrated in FIG. 15, or can also be implemented by software. One or more functions of the information processing apparatus 200 according to the above-described exemplary embodiment may be included in another apparatus.

Heretofore, exemplary embodiments of the present disclosure have been described, but the above-described exemplary embodiments merely indicate examples of concretization in carrying out the present disclosure, and the technical scope of the present disclosure is not to be construed in a limited way based on the above-described exemplary embodiments. In other words, the present disclosure can be implemented in various forms without departing from the technical idea thereof or a major feature thereof. For example, a combination of exemplary embodiments is also included in the disclosure of this specification.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an exemplary embodiment of the present disclosure, it is possible to reduce load on the user that is related to trace recording.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-065234, filed Apr. 11, 2022, which is hereby incorporated by reference herein in its entirety.

What is claimed is:

1. An information processing apparatus comprising:
at least one processor configured to function as:
a recording unit configured to record trace information indicating time-series transition during a predetermined period of a first parameter related to control of an imaging apparatus;
a control unit configured to control the imaging apparatus based on the trace information recorded by the recording unit;
a displaying unit configured to display an image captured in real time by the imaging apparatus controlled based on the trace information; and
an update unit configured to update the trace information in a case where a user operation is performed while the control unit controls the imaging apparatus based on the trace information,
wherein the first parameter is any parameter of a parameter related to a pan value of the imaging apparatus, a parameter related to a tilt value of the imaging apparatus, and a parameter related to a zoom value of the imaging apparatus, and
wherein, in a case where the user operation is performed when a specific time has elapsed since the control unit starts controlling the imaging apparatus based on the trace information, the update unit updates the trace information by associating a second parameter with a timing which is included in the predetermined period and which corresponds to the specific time, the second parameter being designated by the user operation.

2. The information processing apparatus according to claim 1, wherein the control unit controls the imaging apparatus based on the trace information, in a case where a user operation of issuing a reproduction instruction of the trace information is performed,
wherein the update unit updates the trace information in a case where a user operation is performed during reproduction of the trace information that is based on control performed by the control unit using the trace information.

3. The information processing apparatus according to claim 2, wherein the control unit controls the imaging apparatus using the trace information updated by the update unit, in accordance with an instruction issued by a user.

4. The information processing apparatus according to claim 1, wherein the recording unit records the trace information based on a user operation of controlling the imaging apparatus using the first parameter during the predetermined period from a recording start instruction to a recording end instruction.

5. The information processing apparatus according to claim 1, wherein, in the trace information recorded by the recording unit, a plurality of different elapsed times from the recording start, and the first parameters corresponding to the respective elapsed times are recorded in association with each other.

6. The information processing apparatus according to claim 1, wherein, in a case where a control command that is based on the user operation is transmitted to the imaging apparatus at a predetermined elapsed time from a start of reproduction of the trace information.

7. The information processing apparatus according to claim 1,
wherein the second parameter is a parameter different from the first parameter, and is any parameter of a parameter related to the pan value, a parameter related to the tilt value, and a parameter related to the zoom value.

8. The information processing apparatus according to claim 1, wherein the at least one processor is further configured to function as:
a reception unit configured to receive an operation performed by a user,
wherein, in a case where the reception unit receives a user operation for pausing reproduction of the trace information during reproduction of the trace information, the control unit controls the imaging apparatus to stop reproduction of the trace information, and
wherein, in a case where the user operation is performed while reproduction of the trace information is stopped, the update unit updates the trace information.

9. The information processing apparatus according to claim 8,
wherein the second parameter is a parameter different from the first parameter, and is an image capturing parameter related to image capturing of the imaging apparatus.

10. The information processing apparatus according to claim 9, wherein the image capturing parameter is any parameter of a focus value, an exposure value, white balance, and image quality of the imaging apparatus.

11. The information processing apparatus according to claim 1,

wherein the second parameter is a parameter related to any of a focus value, an exposure value, white balance, and image quality of the imaging apparatus.

12. An information processing method performed by an information processing apparatus, the method comprising:

recording trace information indicating time-series transition during a predetermined period of a first parameter related to control of an imaging apparatus;

controlling the imaging apparatus based on the trace information;

displaying an image captured in real time by the imaging apparatus controlled based on the trace information; and in a case where a user operation is performed while the information processing apparatus controls the imaging apparatus based on the trace information, updating the trace information, wherein the first parameter is any parameter of a parameter related to a pan value of the imaging apparatus, a parameter related to a tilt value of the imaging apparatus, and a parameter related to a zoom value of the imaging apparatus, and wherein, in a case where the user operation is performed when a specific time has elapsed since the information processing apparatus starts controlling the imaging apparatus based on the trace information, the trace information is updated by associating a second parameter with a timing which is included in the predetermined period and which corresponds to the specific time, the second parameter being designated by the user operation.

13. A non-transitory computer-readable storage medium storing a program for causing a computer to function as an information processing apparatus comprising at least one processor configured to function as:

a recording unit configured to record trace information indicating time-series transition during a predetermined period of a first parameter related to control of an imaging apparatus;

a control unit configured to control the imaging apparatus based on the trace information recorded by the recording unit;

a displaying unit configured to display an image captured in real time by the imaging apparatus controlled based on the trace information; and an update unit configured to, in a case where a user operation is performed while the information processing apparatus controls the imaging apparatus based on the trace information, update the trace information, wherein the first parameter is any parameter of a parameter related to a pan value of the imaging apparatus, a parameter related to a tilt value of the imaging apparatus, and a parameter related to a zoom value of the imaging apparatus, and wherein, in a case where the user operation is performed when a specific time has elapsed since the information processing apparatus starts controlling the imaging apparatus based on the trace information, the trace information is updated by associating a second parameter with a timing which is included in the predetermined period and which corresponds to the specific time, the second parameter being designated by the user operation.

* * * * *